United States Patent
Zhang et al.

(10) Patent No.: US 10,190,825 B2
(45) Date of Patent: Jan. 29, 2019

(54) SYSTEM AND METHOD FOR DETERMINING TEMPERATURE OF A METAL MELT IN AN ELECTRIC ARC FURNACE

(71) Applicant: ABB Schweiz AG, Baden (CH)

(72) Inventors: Xiaojing Zhang, Väserås (SE); Jan Erik Eriksson, Väserås (SE); Michael Lundh, Väserås (SE); Conny Svahn, Väserås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/501,745

(22) PCT Filed: Aug. 21, 2014

(86) PCT No.: PCT/EP2014/067806
§ 371 (c)(1),
(2) Date: Feb. 3, 2017

(87) PCT Pub. No.: WO2016/026530
PCT Pub. Date: Feb. 25, 2016

(65) Prior Publication Data
US 2017/0227290 A1     Aug. 10, 2017

(51) Int. Cl.
*F27D 3/00* (2006.01)
*F27D 27/00* (2010.01)
(Continued)

(52) U.S. Cl.
CPC ...... *F27D 21/0014* (2013.01); *B01F 13/0809* (2013.01); *C21C 5/5217* (2013.01);
(Continued)

(58) Field of Classification Search
CPC .... F27B 3/085; F27B 3/22; F27B 3/28; F27D 21/00; F27D 21/0014; F27D 27/00;
(Continued)

(56) References Cited

U.S. PATENT DOCUMENTS

| 2012/0140787 | A1 | 6/2012 | Abel et al. |
| 2013/0269483 | A1* | 10/2013 | Eriksson ................. C21C 5/52 |
| | | | 75/10.67 |
| 2016/0069748 | A1* | 3/2016 | Matusewicz .......... C21C 5/4673 |
| | | | 374/130 |

FOREIGN PATENT DOCUMENTS

| CN | 1037210 A | 11/1989 |
| CN | 201926508 U | 8/2011 |

(Continued)

OTHER PUBLICATIONS

International Preliminary Report on Patentability Application No. PCT/EP2014/067806 Completed: Aug. 2, 2016; dated Aug. 2, 2016.
(Continued)

*Primary Examiner* — Hung D Nguyen
(74) *Attorney, Agent, or Firm* — Whitmyer IP Group LLC

(57) ABSTRACT

A system and a method for determining/predicting a tapping time for a metal melt in an electric arc furnace (EAF), at least one electrode is provided for melting the metal melt until it reach a target tapping temperature, the EAF further includes a slag and smoke layer on the surface of the metal melt, wherein an electromagnetic stirrer is provided for stirring the metal melt.

10 Claims, 2 Drawing Sheets

(51) Int. Cl.

| | |
|---|---|
| *F27D 21/00* | (2006.01) |
| *B01F 13/08* | (2006.01) |
| *C21C 5/52* | (2006.01) |
| *H05B 7/18* | (2006.01) |
| *F27D 3/15* | (2006.01) |
| *G01J 5/00* | (2006.01) |
| *F27D 19/00* | (2006.01) |

(52) U.S. Cl.
CPC .......... *C21C 5/5247* (2013.01); *F27D 3/1509* (2013.01); *F27D 27/00* (2013.01); *G01J 5/0044* (2013.01); *H05B 7/18* (2013.01); *C21C 2005/5288* (2013.01); *C21C 2300/06* (2013.01); *F27D 2019/0003* (2013.01); *Y02P 10/212* (2015.11); *Y02P 10/286* (2015.11)

(58) Field of Classification Search
CPC .......... F27D 3/1509; F27D 2019/0003; F27D 2019/0006; G01J 5/00; G01J 5/0003; G01J 5/0037; G01J 5/004; G01J 5/0044; G01J 5/02; G01J 5/029; G01J 5/04; G01J 5/60; H05B 7/18; H05B 7/144; H05B 7/148; C21C 5/5217; C21C 5/5247; C21C 2005/5288; C21C 2300/06; Y02P 10/212; Y02P 10/286

USPC ................. 373/60, 79, 83, 85; 266/233, 234
See application file for complete search history.

(56) References Cited

FOREIGN PATENT DOCUMENTS

| | | |
|---|---|---|
| CN | 102472667 A | 5/2012 |
| DE | 202010017729 U1 | 7/2012 |
| EP | 2287581 A1 | 2/2011 |
| EP | 2290310 A1 | 3/2011 |
| EP | 2616560 A1 | 7/2013 |
| WO | 2011095377 A1 | 8/2011 |

OTHER PUBLICATIONS

International Search Report and Written Opinion of the International Searching Authority Application No. PCT/EP2014/067806 Completed: Apr. 10, 2015; dated Apr. 21, 2015 12 pages.

Chinese Office Action Search Report Application No. 2014800814012 dated Sep. 18, 2017—Issued: Sep. 26, 2017 2 pages.

Ge Guangqing et al: "Principle Efficacy of Electromagnetic Stirring for an Electric Arc Furnaces", Electric Furnace, vol. 1, 1982. 23 Pages.

* cited by examiner

SYSTEM AND METHOD FOR DETERMINING TEMPERATURE OF A METAL MELT IN AN ELECTRIC ARC FURNACE

TECHNICAL FIELD

The present invention relates to a system and a method for determining a tapping time of a metal melt in an electric arc furnace (EAF), wherein the metal melt is stirred by an electromagnetic stirrer.

BACKGROUND

A typical EAF-EMS system comprises an electric arc furnace (EAF) and an electromagnetic stirring system (EMS). The EAF is a furnace utilizing electric arc to melt metallic material. A typical EAF comprises one or more electrodes and a power supply system operatively connected to the electrodes. The EAF is further equipped with gas burners mounted on the sidewalls and arranged to provide chemical energy to the melt. Additional chemical energy is provided by means, e.g. lances, for injecting oxygen and carbon into the furnace. The operation of the electrodes is controlled by a control unit operatively connected to a power supply system. The power supplied to the electrodes thereby creating an arc is called arc power. The electrodes form an arc between the electrodes and the metallic material, i.e. solid metal (e.g. scrap) that has been loaded into the EAF. Thereby, a metallic material is melted and heated by the arc power and chemical energy from the oxygen injection. An electrode controlling system maintains approximately constant current and power input during the melting of the metallic material until the temperature of the metal melt reaches a target tapping temperature thereafter the metal melt is eventually tapped to a ladle furnace. On the surface of the metal melt, slag and smoke layers are formed.

During the melting process, the electromagnetic stirring (EMS) system is arranged to stir the metal melt in the furnace and comprises at least one electromagnetic stirrer including a stirring coil, a power supply system is operatively connected to the stirrer. The stirring coil is typically mounted outside a steel shell of the furnace. This coil generates a travelling magnetic field to provide stirring forces to the metal melt. The stirrer operates at a low frequency travelling magnetic field, penetrating the steel shell of the furnace and moving the melt in a way similar to a linear electric motor. Thus, a linear force is created by the travelling linear magnetic field acting on the melt in the furnace and provides a uniform temperature of the metal melt.

To tap the metal melt at a target tapping temperature is critical for energy consumption as well as advanced EAF control. Today, a temperature of metal melt in the electric arc furnaces is measured with a cartridge in order to obtain a measurement at a time point. There are several disadvantages with such a temperature measuring. Firstly, several temperature measurement trials normally need to be carried out before EAF tapping. These temperature trials may postpone the process time and also increase the cost of consumable probes. Secondly, performing such measuring is an unpleasant task for an operator since he has to face high temperature in a harsh environment while being equipped with bulky clothes.

Patent Application US 2012/0140787A1 discloses a method comprising operating a burner gun unit in a lance mode in which gas stream is guided with supersonic velocity into a furnace chamber. A surface of a metal melt is freely-blown by the gas stream, which is formed over a time period by oxygen-containing gas. To be able to measure temperature of the metal melt, a first gas including oxygen has to be switched over to a second gas that is an inert gas and thereafter the temperature of the metal melt is measured using a temperature measuring unit including a non-contact sensor.

SUMMARY

It is an object of the present invention to achieve more accurate tapping temperature and, consequently, to increase productivity and reduce unnecessary energy consumptions.

In a first aspect of the invention, there is a method for determining a tapping time for a metal melt in an electric arc furnace (EAF), wherein at least one electrode is provided for melting a scrap to the metal melt, wherein the EAF further comprises a slag and smoke layer on the surface of the metal melt, wherein an electromagnetic stirrer is provided for stirring the metal melt, the method comprising
a) supplying a power to the electrode in order to melt the scrap,
b) electromagnetic stirring the metal melt in the EAF,
c) blowing away the slag and smoke layers from the surface of the metal melt by a flow of a gas,
d) non-contactingly measuring a temperature of the metal melt,
e) receiving the measured temperature,
f) calculating a temperature profile based on the received temperature,
g) estimating a tapping temperature at a time point based on the calculated temperature profile and,
h) determining a tapping time based on the estimated temperature, a target tapping temperature and the power supplied to the electrode.

In one embodiment of the invention, the method further comprises steps of
re-calculating or adjusting the temperature profile upon receiving a new measured temperature, estimating a tapping temperature at a time point based on the re-calculated/adjusted temperature profile, and determining a tapping time based on the estimated temperature and a target tapping temperature and the power supplied to the electrode.

In a second aspect, there is a system provided for system for determining a tapping time of a metal melt in an electric arc furnace comprising an electromagnetic stirrer provided for stirring the metal melt, a temperature measuring device for providing temperature measurements of the metal melt and a temperature control unit, wherein the electric arc furnace includes at least one electrode connected to a power supply, wherein temperature control unit is configured to control the metal melt temperature based on the power supplied to the electrode, wherein the temperature measuring device comprises a non-contact sensing unit and a processing unit connected to the sensing unit, wherein the sensing unit is configured to sense/measure the temperature of the metal melt and to send the measured temperature to the processing unit, and the processing unit is configured to receive the measured temperature and process the received temperature. The temperature measuring device further comprises a dedicated lance unit including an inert gas provided to blow away slag and smoke on surface of the metal melt, wherein the processing unit is further configured to send the processed measured temperature to the temperature control unit and the temperature control unit configured to perform steps e)-h) of claim 1.

The arrangement of the electromagnetic stir, non-contact sensing unit and the dedicate lance unit provides synergetic effect on determination of a tapping time. Firstly, the electromagnetic stir mixes the metal melt in the furnace and increases the melting rate. Mostly importantly, the temperature of the melt becomes uniform, which provides reprehensive samples and makes the measurement of temperature meaningful. Due to the uniform melt temperature, it is irrelevant that where the temperature is measured. Secondly, the dedicated lance unit blows away slag and smoke and makes continuously measuring the temperature of the melt possible. With the continuously temperature measurements, the temperature profile of the metal melt can be calculated more accurately, which enables reliable prediction of the tapping time. Furthermore, the non-contact temperature measuring improves operator working environment.

Furthermore, the temperature control unit is further configured to re-calculate the temperature profile based on a new temperature measurement. Thus, a more accurate temperature prediction is achieved.

Preferably, the sensing unit comprises either a non-contact sensor, preferably, in form of microwave radiometer, infrared sensor or fibred optic sensor.

In yet another embodiment of the invention, the dedicated lance unit is arranged to measure the temperature of the metal melt continuously or at several discrete time points. An advantage of measuring the temperature continuously is to enable the metal melt to be tapped into a ladle furnace at a more precise time point. Consequently, tap-to-tap time and unnecessary energy consumption are reduced, and productivity is increased.

BRIEF DESCRIPTION OF THE DRAWINGS

The invention will now be explained more closely by the description of different embodiments of the invention and with reference to the appended figures.

DETAILED DESCRIPTION

Figure 2:
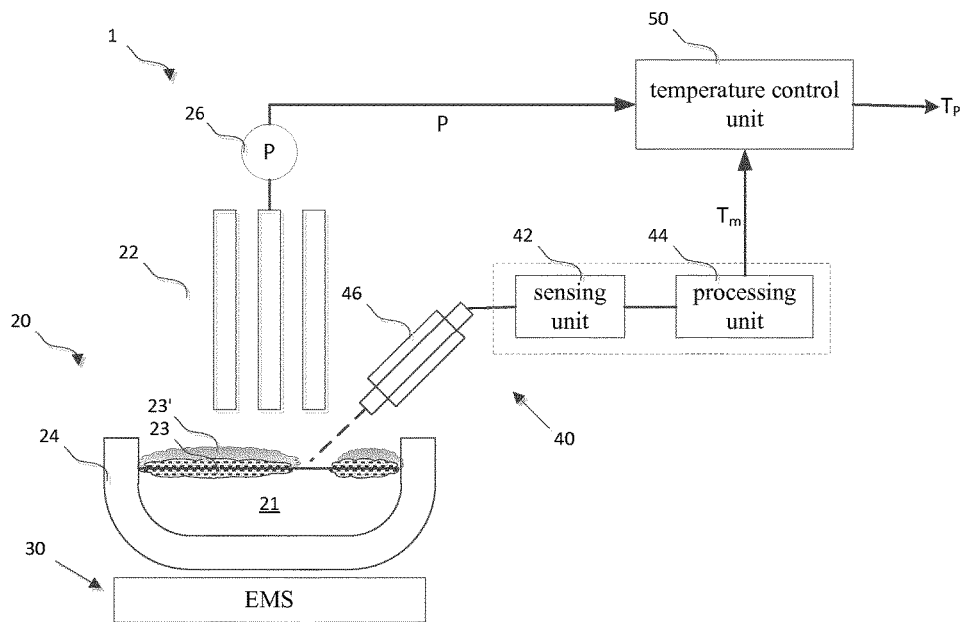
FIG. 2 illustrates a system schematic chart of a system for controlling a tapping temperature of a metal melt in an EAF, according to a third embodiment of the invention.

FIG. 2 illustrates a system 1 for determining/predicting a tapping time of metal melt in an electric arc furnace (EAF) 20 comprising an electromagnetic stirring system (EMS) 30 with an electromagnetic stirrer provided for stirring the metal melt, a temperature measuring device 40 for providing a temperature measurements of the metal melt, and a temperature control unit 50 for estimating/predicting the temperature of the metal melt.

The EAF 20 is arranged for melting metallic materials, for example metals or metal alloys. The EAF may be a DC EAF or an AC EAF.

Figure 1A:
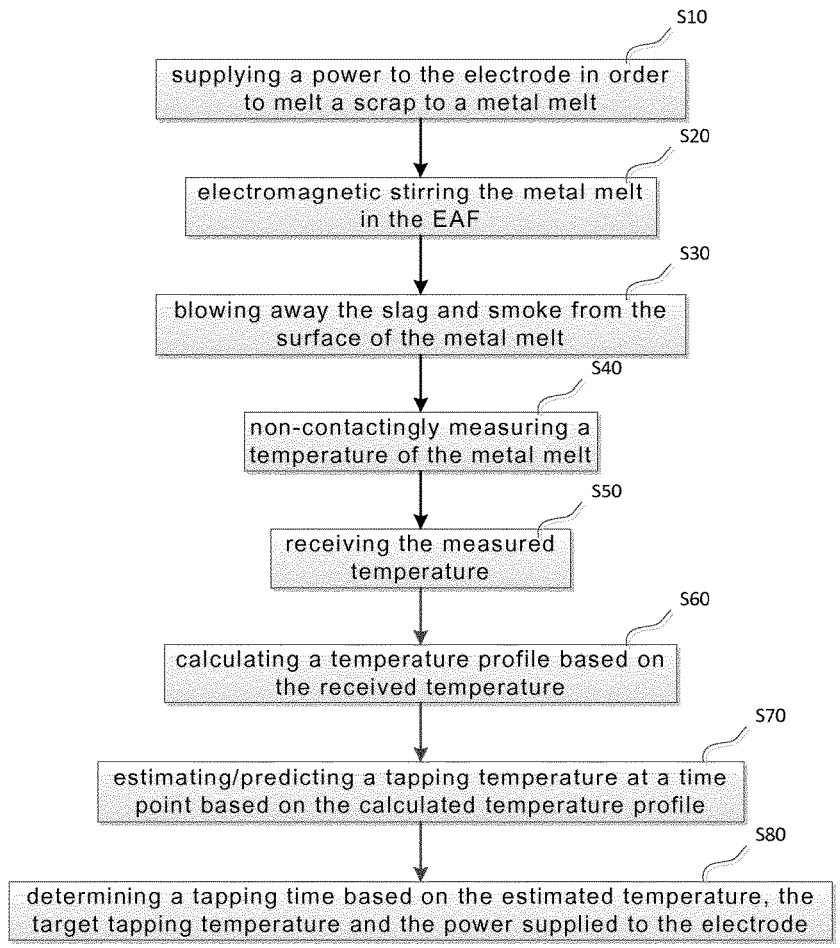
FIG. 1a shows a flowchart of controlling a tapping temperature, according to one embodiment of the invention.
Figure 1B:
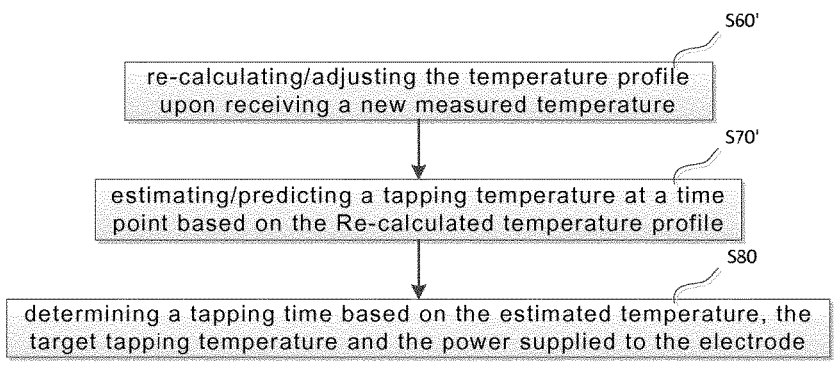
FIG. 1b shows a flowchart of controlling a tapping temperature, according to another embodiment of the invention.

The EAF 20 further comprises one or more electrodes 22 (This example shows three electrodes equipped with the EAF), a vessel 24 covered with a retractable roof (not shown in FIG. 2) through which the electrodes enter the furnace and a power supply system 26 operatively connected to the electrodes 22 for supplying a power to the electrodes in order to melt a scrap to a metal melt, step S10 with reference to FIG. 1.

The EAF operation starts with the vessel 24 being charged with scrap metal, wherein the meltdown commences. The electrodes 22 are lowered onto the scrap and an arc is struck thereby starting to melt the scrap. Lower voltages are selected for this first part of the operation to protect the roof and walls of the furnace from excessive heat and damage from the arcs. Once the electrodes 22 have reached the heavy melt at the base of the furnace 24 and the arcs are shielded by slag, the voltage can be increased and the electrodes are raised slightly, thereby lengthening the arcs and increasing power to the melt. As the scrap is melt into a metal melt 21, a slag layer 23 is formed on the surface of the melt 21. Moreover, a smoke layer 23' may be formed above the slag layer.

The EMS 30 is mounted on an outer surface, preferably the bottom of the EAF vessel 24. The EMS system 30 includes at least one electromagnetic sitter arranged to stir a metal melt in the EAF, step S20. With the electromagnetic stirring, the melting rate in the vessel 24 is accelerated and the melt temperature becomes more homogeneous. The homogeneous temperature is particularly important for a modern EAF that has a big vessel with a diameter up to 8 meters to decrease local variations of the melt temperature. Thus, the local variations of the melt temperature is decreased tremendously comparing with no stirring and consequently, the temperature of the melt is uniform.

Due to smoke and harsh environment of production sites, it is difficult to measure the temperature of a melt. One way to measure a melt temperature is to use disposable temperature probes or cartridges. A probe or cartridge is thrown into the melt at end of the refining process. If not a sufficient temperature is obtained a further probe is placed until a correct or close enough temperature is obtained. Thus, to measure the melt temperature, an operator may have to repeat this tasks several times. If the obtained melt temperature is above the target tapping temperature, a large amount of arc power/energy has been already wasted. Therefore, it is advantageous that melt temperatures can be measured continuously or at a sufficiently high sampling rate to prevent the melt from a late tapping.

To this end, the temperature measuring device 40 is arranged to measure melt temperature. The temperature measuring device 40 comprises a non-contact sensing unit 42 and a processing unit 44 connected to the sensing unit 42. The sensing unit 42 is configured to sense/measure the temperature of the metal melt and to send the measured temperature to the processing unit 44, step S40. While the processing unit 44 is configured to receive the measured temperature, to process the received temperature and to send the processed measured temperature to the temperature control unit 50. The temperature measuring device 40 further comprises a dedicated lance unit 46 that may be mounted on a side wall of the EAF. A non-contact sensing unit includes a non-contact sensor. Essentially, any kind of non-contact sensors may be used for measuring the temperature of the melt. In this example, an optic fiber is used and is mounted inside a metal tube. The metal tube is further mounted inside the lance unit. This arrangement may measure a high temperature over 2000° C. For cooling the optic sensor, a cooling media is arranged outside of the metal tube.

However, the slag and smoke layers 23', 23 formed on the surface of the metal melt in the vessel 24 prevents the non-contact sensing unit 42 from accurately measuring. The lance unit 46 is therefore provided and configured to inject an inert gas to the melt surface. The inert gas is injected with a high pressure to blow away the slag and smoke layers 23', 23, which drills a hole through the smoke and the slag layers 23', 23 so that the optical sensor can measure the temperature with a slag and smoke-free melt surface, step S30. The measured temperature will be further sent to the processing unit 44 in which the measured signal is analyzed and processed, S40.

The measured temperatures are transferred through the optic fiber to the processing unit 44 that may include, for example, a spectrometer. Spectrums are processed analyzed and thereafter to input to the temperature control unit 50, step S50.

The temperature control unit 50 is provided with an EAF melt temperature prediction model that is built in for calculating a melt temperature profile in order to estimate/predict a melt temperature at a time point, step S60 and S70. The profile is calculated based on the processed temperature measurements $T_m$ and power P supplied to the electrodes. There are many well-known control models that can be used for this purpose. For the present invention, an extended Kalman filter is applied for the estimation prediction of the tapping time. The temperature profile is further adjusted upon receiving a new measured temperature to achieve a more accurate temperature estimation, step S60' and S70'. With the adjusted temperature profile, a time to reach a pre-defined tapping temperature can be predicted and a tapping time therefore is determined, step S80.

Besides the advantages mentioned above, further advantages of using non-contact sensing unit are that wide range of wavelengths can be covered and measurement area or points can be well defined, for example a number of measuring points can be defined for a sensor. Moreover, other physical properties can be sensed as well.

Figure 3:
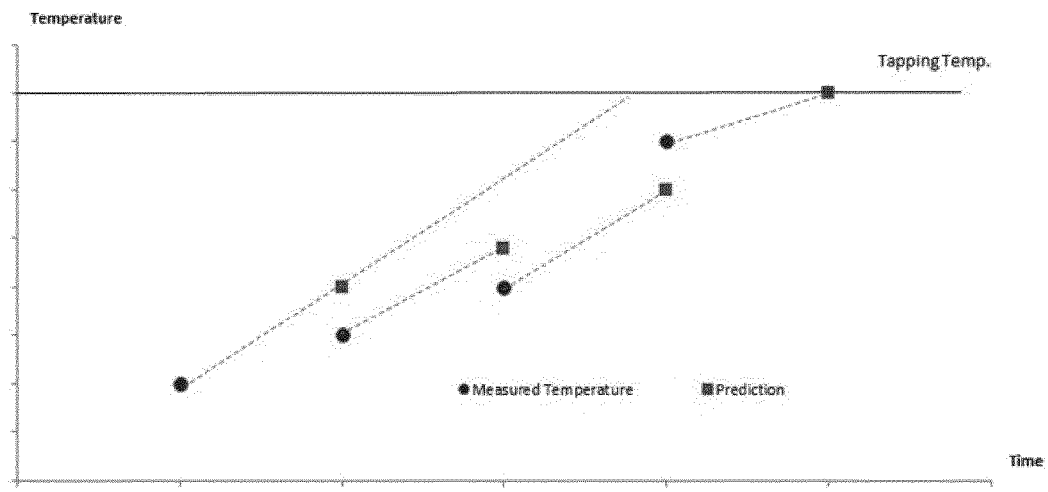
FIG. 3 illustrates a tapping temperature estimation of the embodiments of FIGS. 1a-1b and FIG. 2.

FIG. 3 shows that a temperature profile is continuously adjusted based on measured temperatures. Based on the profile, the tapping temperature is predicted accordingly and thus a tapping time as well.

The temperature control unit 50 may comprise hardware, a memory unit, at least a processing unit into which software is loaded.

Using non-contact sensors enables a tapping just in time and thus increases productivity and saves large amount energy of arc power.

It should be understood that the scope of the invention must not be limited the presented embodiments, it shall cover other embodiments that are obvious to a person skilled in the art.

The invention claimed is:

1. A method for determining a tapping time for a metal melt in an electric arc furnace (EAF), wherein at least one electrode is provided for melting the metal melt until it reaches a target tapping temperature, wherein the EAF further comprises a slag and smoke layer on a surface of the metal melt, wherein an electromagnetic stirrer is provided for stirring the metal melt, the method comprising:
   a) supplying a power to the electrode in order to melt a scrap to the metal melt,
   b) stirring the metal melt in the EAF using the electromagnetic stirrer,
   c) arranging a lance unit dedicatedly configured to include an inert gas,
   d) blowing away the slag and smoke from the surface of the metal melt using the inert gas from the dedicatedly arranged lance unit,
   e) non-contactingly measuring a temperature of the metal melt,
   f) receiving the measured temperature,
   g) calculating a temperature profile based on the measured temperature using a temperature control unit,
   h) estimating a tapping temperature at a first time point based on the calculated temperature profile using the temperature control unit, and
   i) determining the tapping time based on the estimated tapping temperature at the first time point, the target tapping temperature, and the power supplied to the electrode.

2. The method according to claim 1, comprising
   j) adjusting the temperature profile upon receiving a new measured temperature using the temperature control unit,
   k) estimating/the tapping temperature at a second time point based on the adjusted temperature profile using the temperature control unit, and
   l) determining the tapping time based on the estimated temperature at the second time point, the target tapping temperature, and the power supplied to the electrode.

3. A system for determining a tapping time of a metal melt in an electric arc furnace comprising:
   an electromagnetic stirrer provided for stirring the metal melt,
   a temperature measuring device for providing temperature measurements of the metal melt, and
   a temperature control unit,
   wherein the electric arc furnace includes at least one electrode connected to a power supply,
   wherein the temperature control unit is configured to control the metal melt temperature based on a power supplied to the at least one electrode,
   wherein the temperature measuring device comprises a non-contact sensing unit and a processing unit connected to the non-contact sensing unit,
   wherein the non-contacting sensing unit is configured to measure a temperature of the metal melt and to send the measured temperature to the processing unit, and the processing unit is configured to receive the measured temperature and to process the measured temperature,
   wherein the temperature measuring device comprises a lance including an inert gas provided to blow away slag and smoke layers on a surface of the metal melt,
   wherein the processing unit is configured to send the processed measured temperature to the temperature control unit, and the temperature control unit is configured to receive the measured temperature, calculate a temperature profile based on the measured temperature using the temperature control unit, estimate a tapping temperature at a first time point based on the calculated temperature profile using the temperature control unit, and determine the tapping time based on the estimated tapping temperature at the first time point, the target tapping temperature, and the power supplied to the electrode.

4. The system according to claim 3, wherein the temperature control unit is further configured to re-calculate the temperature profile based on a new temperature measurement.

5. The system according to claim 3, wherein the sensing unit comprises a non-contact sensor, the non-contact sensor is a microwave radiometer, infrared sensor, or fibred optic sensor.

6. The system according to claim 3, wherein the temperature measuring device is arranged to measure the temperature of the metal melt continuously or at discrete time points.

7. A system for determining a tapping time of a metal melt in an electric arc furnace comprising:
- at least one electrode connected to a power supply for melting a scrap into the metal melt;
- an electromagnetic stirrer for stirring the metal melt into a uniform metal melt temperature;
- a temperature measuring device for providing temperature measurements of the metal melt, the temperature measuring device having a lance unit, the lance unit including an inert gas provided to blow a slag and smoke layer from a surface of the metal melt while maintaining the metal melt temperature;
- a temperature control unit configured to control the metal melt temperature based on a power supplied to the at least one electrode;
- the temperature measuring device includes a non-contacting sensing unit and a processing unit connected to the non-contacting sensing unit;
- the non-contacting sensing unit is configured to measure the metal melt temperature and to send the measured metal melt temperature to the processing unit;
- the processing unit is configured to receive the measured metal melt temperature, process the measured metal melt temperature, and send the measured metal melt temperature to the temperature control unit; and
- the temperature control unit is configured to receive the measured metal melt temperature, calculate a temperature profile based on the measured metal melt temperature, predict a tapping temperature at a time point based on the calculated temperature profile, and determine the tapping time.

8. The system according to claim 7, wherein the temperature control unit is configured to re-calculate the temperature profile based on a new metal melt temperature measurement.

9. The system according to claim 7, wherein the metal melt temperature measurement is representative of the uniform metal melt temperature taken at any location of the metal melt.

10. The system according to claim 7, wherein the non-contact sensing unit includes a cooling medium.

\* \* \* \* \*